United States Patent [19]

Lauttenbach et al.

[11] Patent Number: 5,377,622
[45] Date of Patent: Jan. 3, 1995

[54] LIVE AQUATIC FOOD PRODUCTS PRESERVATION, PRESENTATION AND CUSTOMER SELF-SERVE STORAGE SYSTEM

[75] Inventors: Thomas L. Lauttenbach, Raymond, N.H.; Philip Dunkelbarger, Beverly, Mass.

[73] Assignee: Marine Biotech, Inc., Beverly, Mass.

[21] Appl. No.: 48,815

[22] Filed: Apr. 16, 1993

[51] Int. Cl.⁶ ............................................... A01K 63/00
[52] U.S. Cl. ....................................................... 119/200
[58] Field of Search ............... 119/200, 215, 234, 245, 119/248, 251; 312/236; 62/246, 252

[56] References Cited

U.S. PATENT DOCUMENTS

| | | | |
|---|---|---|---|
| 1,282,241 | 10/1918 | Kosmerl | 312/236 X |
| 3,757,739 | 9/1973 | Whitener | 119/245 X |
| 3,774,575 | 11/1973 | Patterson | 119/245 |
| 4,279,218 | 7/1981 | Brinkwork | 119/234 X |

FOREIGN PATENT DOCUMENTS 946027 11/1986 U.S.S.R. ................... 119/234

Primary Examiner—Gene Mancene
Assistant Examiner—Thomas Price
Attorney, Agent, or Firm—Iandiorio & Teska

[57] ABSTRACT

A live aquatic food products preservation, presentation and customer self-serve storage system including a display case with one or more doors to provide customer access. There are a number of see-through containers for holding the individual food portions. The containers include a number of small openings for allowing air and water to pass therethrough to keep the food alive. The system includes a water charge and a pump for delivering the water to the display case. There is a manifold of one or more pipes in the case above the containers and interconnected to the pump. The pipe has openings for delivering pumped water to the containers. Further included is a system for collecting the sprayed water and delivering it to the pump. There is also a provision for cooling the water to extend the animal life.

18 Claims, 4 Drawing Sheets

LIVE AQUATIC FOOD PRODUCTS PRESERVATION, PRESENTATION AND CUSTOMER SELF-SERVE STORAGE SYSTEM

FIELD OF INVENTION

This invention relates to a live aquatic food products preservation, presentation and customer self-serve storage system that allows many types or aquatic food products to be displayed for sale to customers.

BACKGROUND OF INVENTION

Live aquatic animals, such as lobster, crab, crayfish, shellfish, urchins, and fish, are sold in many countries throughout the world. In retail stores, as well as restaurants, the aquatic animals are kept in large tanks of water that is constantly circulated and filtered. The tanks can hold up to several layers of animals on the bottom. When a customer desires to purchase a lobster, for example, or a cook needs to select one, an attendant must reach into the tank with his hand or an instrument such as a net to remove the animal. Sometimes this process is repeated when a customer changes his mind or the attendant selects tile wrong animal. Thus, the amount of attendant time and consequently incremental cost is relatively large. Another problem with this arrangement is that many times the attendants are constantly putting their arms in the water. Crustaceans, as well as the bacteria that are used to filter the crustaceans' waste from the water, are very sensitive to impurities such as soaps and colognes that may be on the skin. Thus, such constant exposure may kill tile bacteria, which inevitably also kills the crustaceans, requiring not only the replacement of the crustaceans but the filtration media with the bacteria as well.

Shellfish such as clams and mussels are often kept on a bed of ice for retail display. The fresh water ice is actually toxic to the marine shellfish and thus slowly kills them. In addition, the shellfish dry out as they sit on the ice, reducing the market value and shortening the product life. Further, like other aquatic animals, the shellfish must be manually retrieved and weighed for retail sale. Accordingly, the cost of displaying and selling aquatic animals such as crustaceans and shellfish is so high that many operations do not make money on the sale.

SUMMARY OF INVENTION

It is therefore an object of this invention to provide a live aquatic food products preservation, presentation and customer self-serve storage system.

It is a further object of this invention to provide such a system that greatly reduces tile cost of retail sale of live aquatic animals, especially crustaceans and shellfish.

It is a further object of this invention to provide such a system which increases the number of live aquatic animal portions that can be stored in a given floor area.

It is a further object of this invention to provide such a system that is lighter weight than comparable currently used storage systems.

It is a further object of this invention to provide such a system that does not require an attendant.

It is a further object of this invention to provide such a system which can simultaneously store and display many different types of live aquatic food animals.

This invention results from the realization that individual aquatic food portions can be stored alive and presented for sale in separate see-through and water flow-through containers on flow-through shelves in a display case that is continuously supplied with a spray of water to keep the animals' gills wet, and from the further realization that the portions can be preweighed and labelled for retail sale so that the storage system also becomes a self-serve aquatic food display.

This invention features a live aquatic food product preservation, presentation and customer self serve storage system comprising a display case, customer access to the case such as one or more doors, see-through containers for holding individual food portions, the containers including a plurality of small openings for allowing air and water to pass therethrough to keep the food alive, means in tile display case for holding the containers, a water charge, a pump for delivering the water to the display case, a conduit such as a pipe interconnected with the pump having openings for delivering pumped water to the containers, means for collecting water in the display case and delivering it to the pump, and means for maintaining a desired water temperature, such as by determining the temperature and in response cooling or heating the water to a temperature suited for the animals to extend their lives.

The system may also include means such as a switch or a photoelectric device for interrupting pump operation when a door is opened to reduce the amount of splashing water when the customer reaches in to choose a container, and also to reduce tile amount of water lost through the open door. The containers may be held on shelves which may be perforated to allow water to pass therethrough. In one embodiment, the containers are hinged rigid containers having at least partially engagable and separable portions such as hinged top and lower portions that can be snapped and unsnapped together. The containers may include a concave top for collecting water and a convex bottom for collecting water. The containers may alternatively include flexible mesh bags or other pass-through containers that can hold individual portions of food. Preferably, the containers are prelabeled for retail sale with labels that include such information as contents, weight, price per pound, total price, and a UPC or other scannable code for the cash register.

The display case and reservoir tank are preferably insulated. The containers may include openings through the top and bottom, or openings through the top and the sides to allow water to pool in the bottom for storing seafood that must remain submerged. The doors may be sliding doors and are preferably transparent.

DISCLOSURE OF PREFERRED EMBODIMENT

Other objects, features and advantages will occur to those skilled in the art from the following description of a preferred embodiment and the accompanying drawings, in which.

Figure 1:
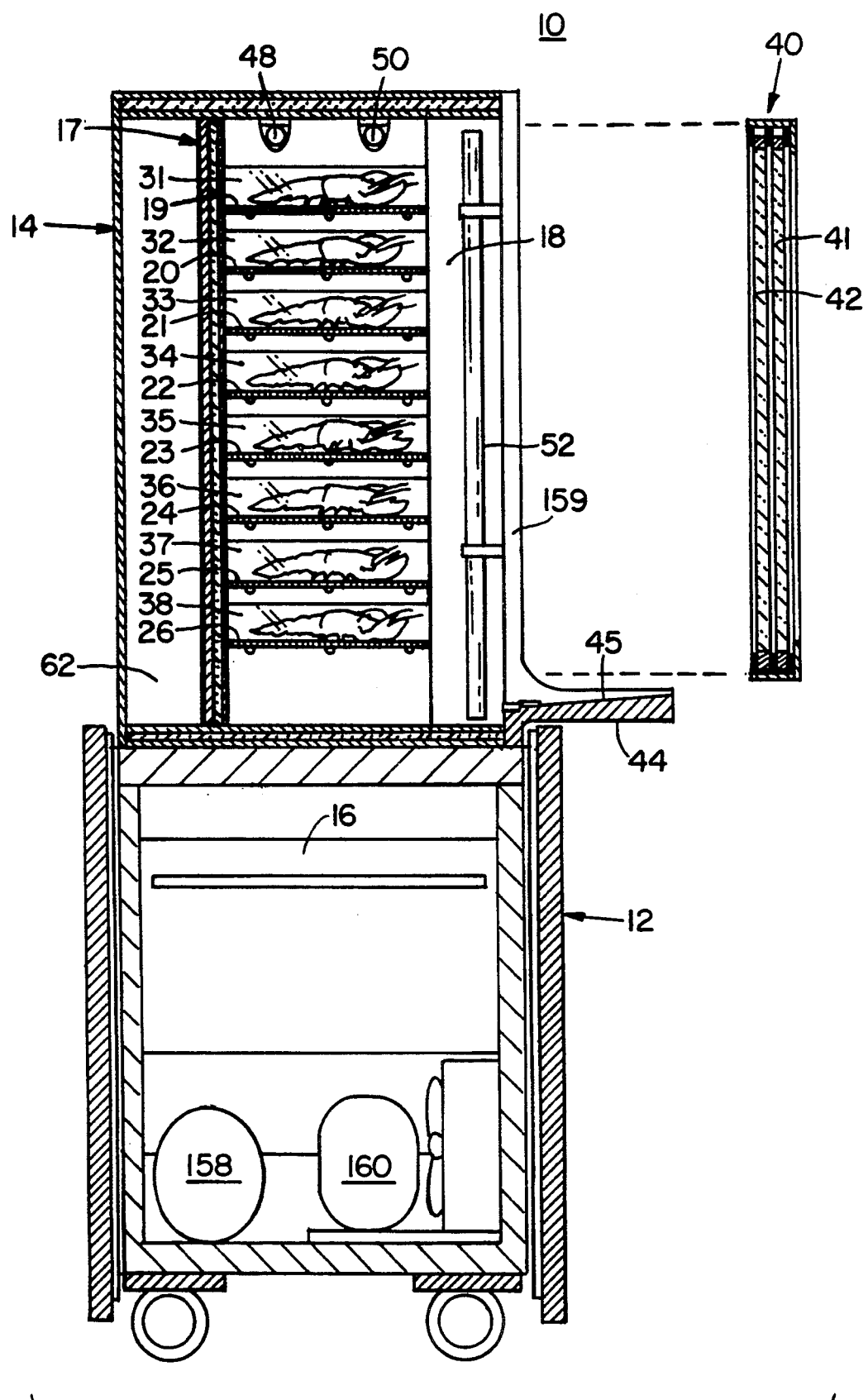
FIG. 1 is a side cross sectional partially exploded view of a preferred form of the live aquatic animal preservation, presentation and customer self-serve storage system according to this invention.

There is shown in FIG. 1 live aquatic animal preservation, presentation and customer self-serve storage system 10 according to this invention. System 10 includes watertight display case 14 for holding the animals, mounted on top of base member 12 that collects, filters, pumps and cools the water circulated through display case 14 to keep the animals therein alive.

Case 14 is divided by wall 17 into front compartment 18 and rear compartment 62. Front compartment 18 includes perforated shelves 19 through 26 for holding see through aquatic animal portion containers 31 through 38, respectively. Pipe manifolds 48 and 50 run across the top of case 14 to supply cooled, filtered water that drips down through case 14 as described in more detail below to keep tile gills of the aquatic animals wet and thus keep them alive. Since tile water is cooled, tile animals are kept in a less active state, thereby increasing the amount of time during which the animal can stay alive to months.

Case 14 includes some means of allowing customer access, such as an opening that may or may not be covered with a curtain or door. In this example, door unit 40 includes sliding see-through doors 41 and 42 that provide access to self-serve aquatic food storage compartment 18 so that customers can help themselves to the prepackaged food kept therein. The doors need not be transparent or even translucent. Fluorescent light 52 lights the inside of compartment 18. Outside lower shelf 44 catches any water that sprays out through door unit 40 and includes sloped shelf 45 that allows the water to run back into case 14 through a number of openings through front wall frame 159.

The water that drips down through the shelves to the bottom of case 14 runs through an opening or pipe, not shown, into reservoir 16 in lower unit 12. The water first runs through a particulate filter (a Light Duty Hand Pad, product M93 from the Loren Products division of Purex Corporation) for removing gross particulates. At the bottom of reservoir 16 there is a 3" to 4" layer of #1 grain silica from U.S. Silica in Connecticut. The silica or other media bottom fosters the known types of bacteria that feed off of the animal wastes to keep the water clean. The sand also acts as a mechanical filter for smaller particulates. Pump 158 draws the water through the sand and returns it back to manifold 48 and 50 after first passing through an activated carbon bed for adsorbing organic molecules, and cooling unit 160 to maintain the temperature of the water at a desired level, typically from 38° F. to 45° F. Preferably, all of the external walls of system 10 are insulated to help maintain the temperature at the desired level.

Figure 2:
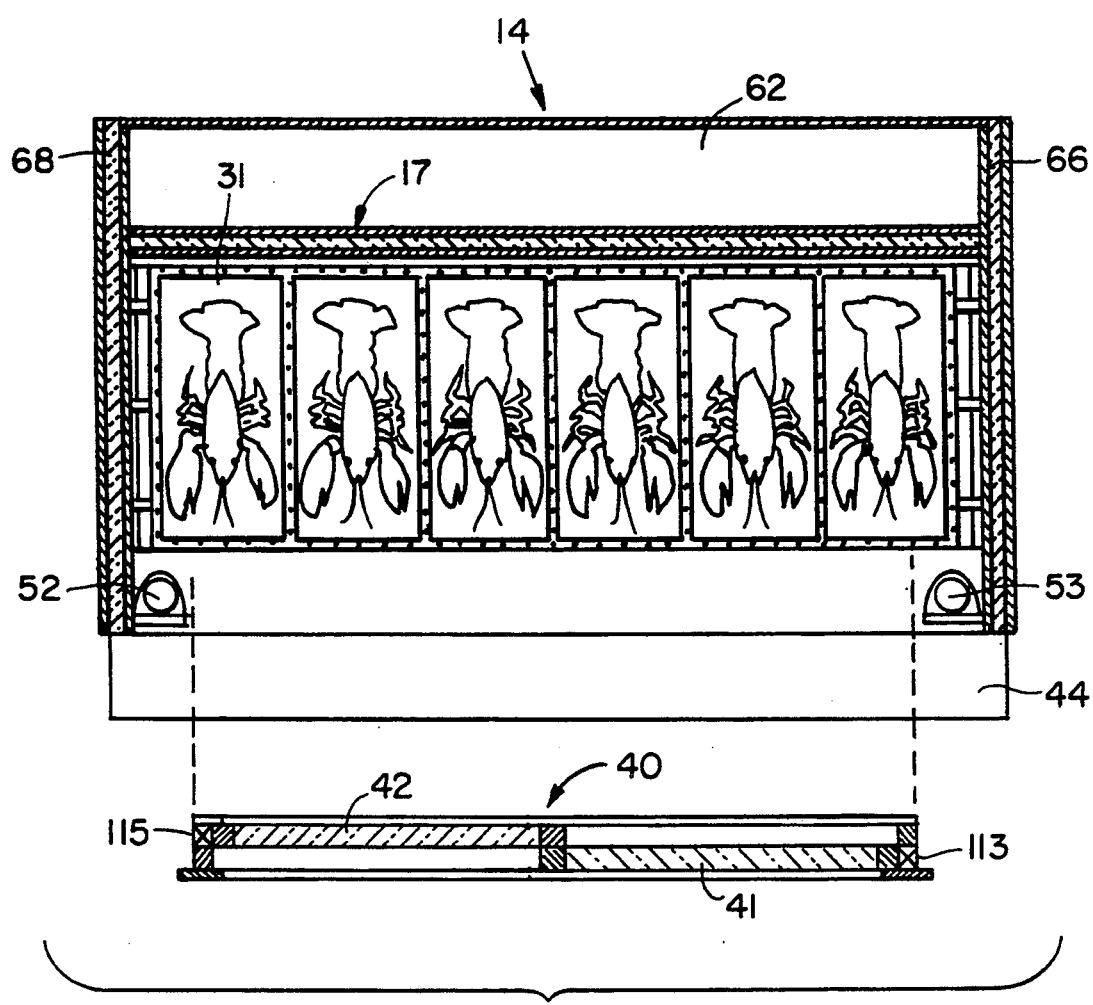
FIG. 2 is a top, partially exploded view of the system of FIG. 1.

FIG. 2 is a top view of the system of FIG. 1 detailing the placement of fluorescent lights 52 and 53 as well as the insulation in walls 66 and 68. Wall 17 creates dry rear compartment 62 that can be used to house much of the electrical system of the invention as described below in conjunction with FIG. 4. Door unit 40 includes clear acrylic sliding doors 41 and 42 to provide customer access to containers such as containers 31 for holding live aquatic food products. Switches or photoelectric controls 113 and 115 are used to sense when doors 41 and 42, respectively, are open and closed so that the water spray and compressor may be shut off when the doors are open, also as further described below.

Figure 3:
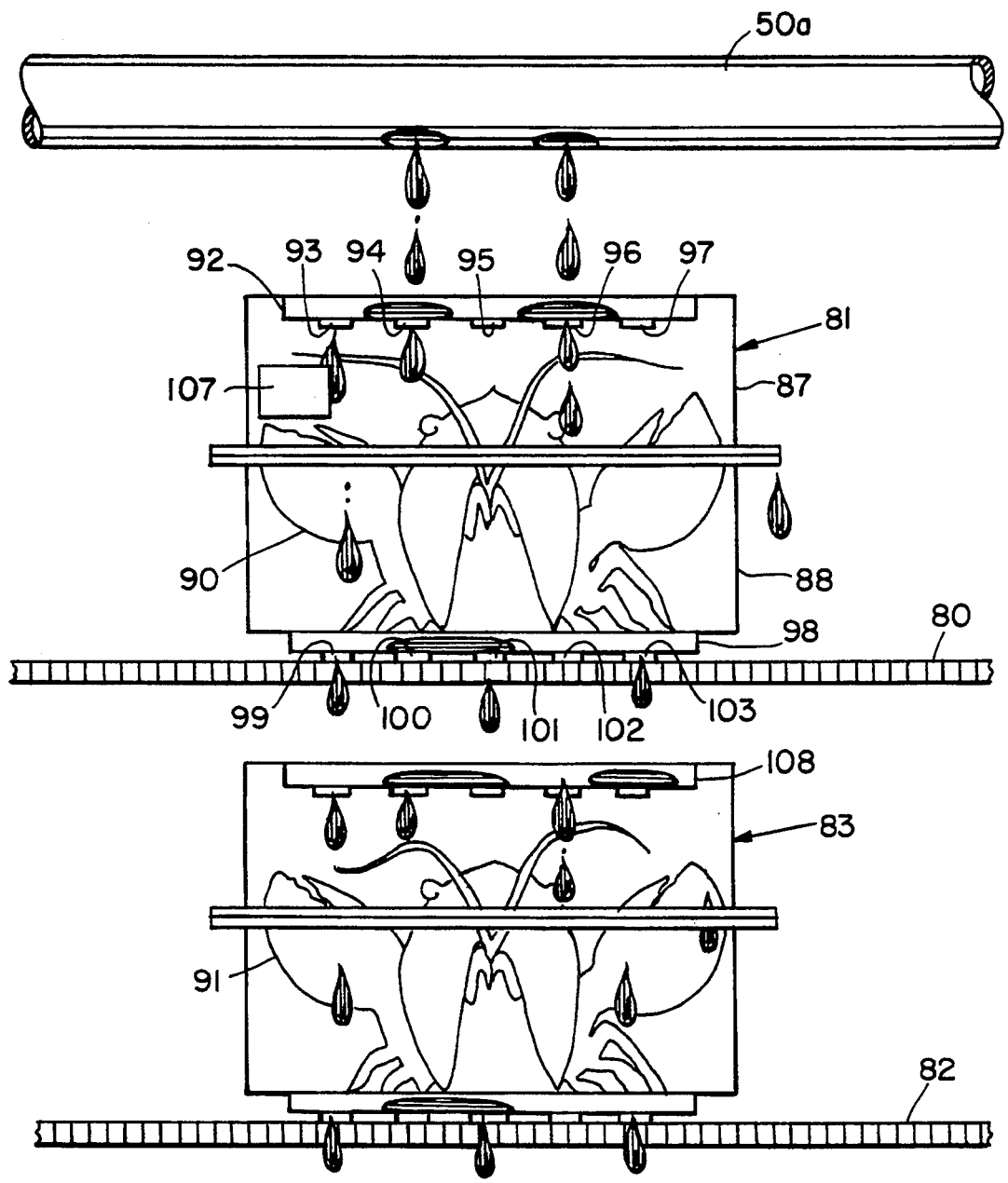
FIG. 3 is a schematic diagram of two of the see-through aquatic animal storage containers, and a portion of the water distribution system of the system of FIG. 1.

FIG. 3 discloses more detail of the water spray and distribution system for system 14, FIG. 1. Water pipe 50a runs along the top of the display case and has a number of holes along its length that drip or spray water down onto containers 81 and 83 containing lobsters 90 and 91, respectively. Each container such as container 81 has a top half 87 and a bottom half 88 that are preferably joined by a hinge along one side, and include along the other side some engagement means so that the container can be opened and closed. The containers may be #95 clear hinged trays from Pacific Packaging Products, Inc., Lawrence, Mass. Preferably the container is transparent so that the purchaser may see the individual seafood portion contained therein. Label 107 on container 81 may include typical retail information such as the nature of the contents, the weight, price per pound and total price, and may include a UPC or other symbol that can be scanned at the register so that the customer can bring the portion directly to checkout. Waterproof bags may be provided for the customer to insert the container into.

In one example, container 81 serves to both confine, store and present for purchase lobster 90. The lobster is kept alive within container 81 by allowing air and water to pass therethrough so that the crustacean's gills remain wet and it is able to respire. This is accomplished in this example by including concave area 92 at the top of the container that collects water that falls thereon from pipe 50a. Portion 92 has inward-flared holes 93 through 97 therein that allow the cool water to drip therethrough to keep lobster 90 moist. Bottom 88 has convex water collecting portion 98 extending therefrom with outwardly flared holes 99 through 103 that together serve to collect and drain water from container 81 so that it does not pool therein.

Alternatively, for holding barnacles or other fresh or salt-water aquatic animals that need to remain submerged, the exit holes such as holes 99 through 103 may be placed in the sides of the container at a desired height to establish a desired water level in the container. The water leaving container 81 drips through perforated shelf 80 and into water collecting recess 108 of lower container 83. The system may include some means of maintaining proper vertical alignment between containers 81 and 83 so that recess 108 collects water dripping out of portion 98 of upper container 81. Water leaving container 83 passes through lower perforated shell 82 onto another lower container or into the bottom of the tank through a collection system. This arrangement allows the storage system of this invention to have a number of vertically aligned shelves each of which can contain one or more seafood portion holding containers so that the system can be used to hold a large number of seafood portions without taking up a concurrently large floor area. Such vertical storage capability is especially attractive in rooms without much space, for example, kitchens in restaurants and cruise ships. Other containers, such as mesh bags that may be hung in the case, could be used. In that case, the water may be delivered from pipes along the sides of the display case because the course of water from container to container would not be as orderly as is the case with the hinged, rigid containers.

Figure 4:
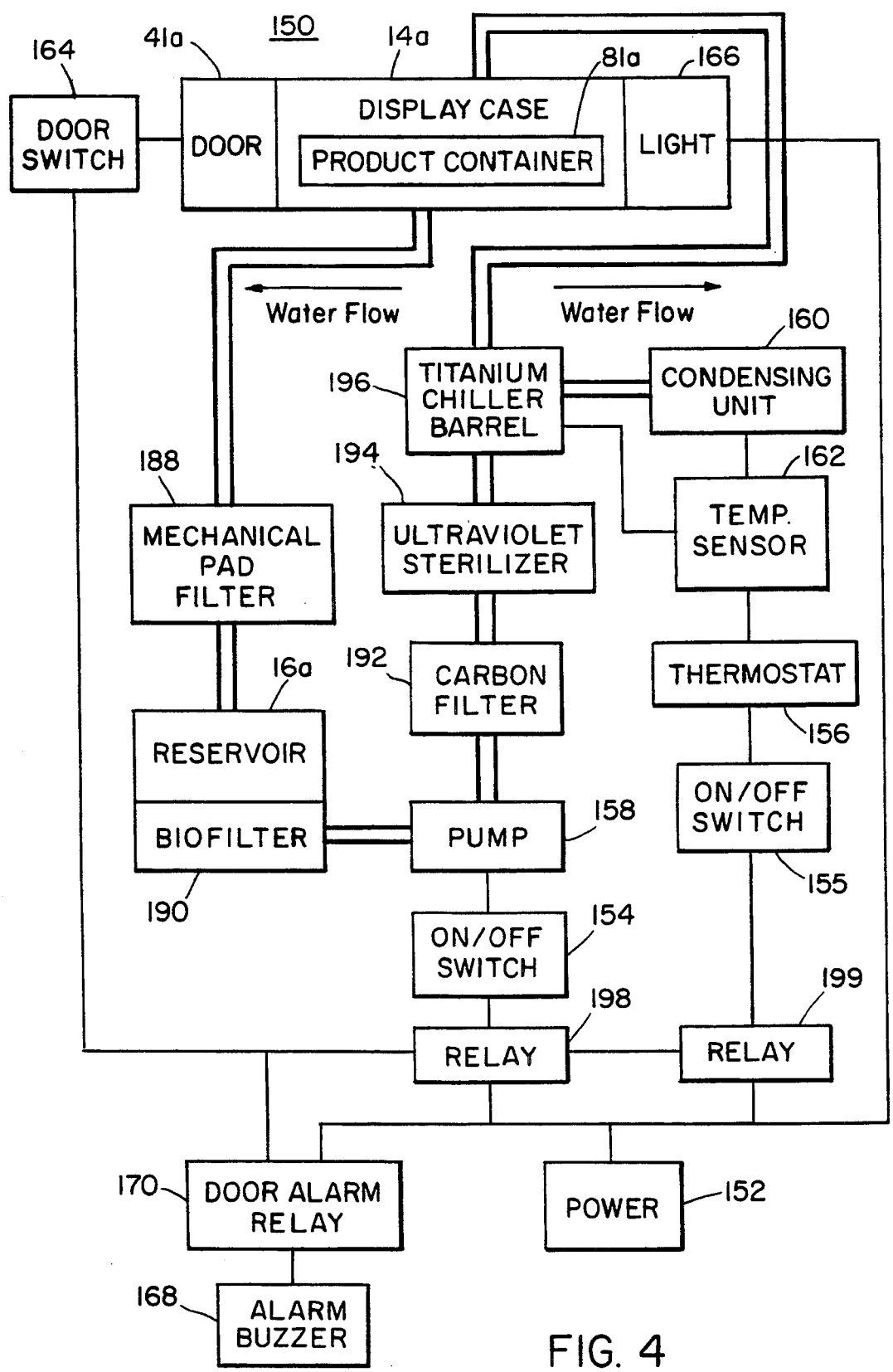
FIG. 4 is a block diagram of the electrical system and the water flow system of the system of FIG. 1.

An electrical and water flow schematic for the system of FIGS. 1 through 3 is shown in FIG. 4. Electrical system 150 includes power source 152 which is typically stepped down to a lower operating voltage so that there is less hazard of electrical shock. The system also preferably includes a ground fault circuit interrupter to protect the customers to the greatest extent possible. Door switch 164 senses when door 41a is open or closed. Preferably, the door switch is a photoelectric device, but it could be another type of sensing device such as a microswitch. When door switch 164 senses that the door is closed, the power to pump 158 and condensing unit 160 of the water refrigeration system is turned on through relays 198 and 199. When the door is opened, they are turned off. Upon the sensing of a door open condition, the door alarm timer delay 170 is enabled. This provides a preestablished and preferably operator-controllable time delay between when the doors are open and when alarm buzzer 168 is sounded so that store personnel can be notified of a door open condition in which pump 158 and condensing unit 160 are not operating. Temperature sensor 162 placed in the tank, or the water chiller 196, or the water reservoir, in conjunction with thermostat 156 and condensing unit 160 maintains the water at a predetermined temperature correct for the particular animals in the case. The system may also include a heater responsive to the thermostat if necessary to maintain a desired temperature. This prolongs life especially in comparison to storage on ice, which is too cold for most animals, and toxic to salt water animals. On/off switches 154 and 155 control power source 152 which turns the whole unit on and off, including fluorescent lights 166 to light the interior of display case 14a. For units that will be used to display shellfish, it may also be desirable to include ultraviolet light sterilizer 194 somewhere in the water transport system as shown to maintain sterile conditions that help to keep shellfish in better health. Pad filter 188 is before reservoir 16a which includes tile silica biofilter 190. Carbon filter 192 is on the pressure side of pump 192.

Although specific features of tile invention are shown in some drawings and not others, this is for convenience only as some feature may be combined with any or all of the other features in accordance with the invention.

Other embodiments will occur to those skilled in the art and are within the following claims:

What is claimed is:

1. A live aquatic food product preservation, presentation and customer self-serve storage system, comprising:
   a display case;
   means for providing customer access to said display case;
   see-through containers for holding individual aquatic food portions, said containers including a plurality of small openings for allowing air and water to pass therethrough to keep the aquatic food animals alive;
   means in said display case for holding said containers;
   a water charge;
   a pump for delivering the water to said display case;
   a water conduit interconnected to said pump and having openings for delivering pumped water to said containers;
   means for collecting water in said display case and delivering it to said pump; and
   means for maintaining the water at a desired temperature to extend the animals' life.

2. The live aquatic food product preservation, presentation and customer self-serve storage system of claim 1 further including means for interrupting pump operation when a said door is opened to reduce the amount of splashing water when a customer reaches in to choose a container.

3. The live aquatic food product preservation, presentation and customer self-serve storage system of claim 2 in which said means for interrupting includes a switch activated by said door.

4. The live aquatic food product preservation, presentation and customer self-serve storage system of claim 2 in which said means for interrupting includes photoelectric control means for sensing door movement and interrupting the pump.

5. The live aquatic food product preservation, presentation and customer self-serve storage system of claim 1 in which said means for holding said containers includes at least one shelf.

6. The live aquatic food product preservation, presentation and customer self-serve storage system of claim 5 in which said shelves are perforated to allow water to pass therethrough.

7. The live aquatic food product preservation, presentation and customer self-serve storage system of claim 1 in which said containers are hinged rigid containers having at least partially engagable and separable portions.

8. The live aquatic food product preservation, presentation and customer self-serve storage system of claim 7 in which said containers include a concave top for collecting water.

9. The live aquatic food product preservation, presentation and customer self-serve storage system of claim 7 in which said containers include a convex bottom for collecting water.

10. The live aquatic food product preservation, presentation and customer self-serve storage system of claim 1 in which said display case is insulated.

11. The live aquatic food product preservation, presentation and customer self-serve storage system of claim 1 in which said containers include flexible mesh bags.

12. The live aquatic food product preservation, presentation and customer self-serve storage system of claim 1 in which said containers include openings through the top and bottom.

13. The live aquatic food product preservation, presentation and customer self-serve storage system of claim 1 in which said containers include openings through the top and a side for allowing water to pool in the bottom.

14. The live aquatic food product preservation, presentation and customer self-serve storage system of claim 1 in which said means for providing access includes a door.

15. The live aquatic food product preservation, presentation and customer self-serve storage system of claim 14 in which said door is transparent.

16. The live aquatic food product preservation, presentation and customer self-serve storage system of claim 1 in which said means for maintaining includes means for cooling the water.

17. The live aquatic food product preservation, presentation and customer self-serve storage system of claim 1 in which said means for maintaining includes means for heating the water.

18. The live aquatic food product preservation, presentation and customer self-serve storage system of claim 1 in which said means for maintaining includes means for determining the water temperature and in response heating or cooling the water as required.

* * * * *